United States Patent
Chirca et al.

(10) Patent No.: US 11,875,155 B2
(45) Date of Patent: Jan. 16, 2024

(54) PROCESSING DEVICE WITH A MICROBRANCH TARGET BUFFER FOR BRANCH PREDICTION USING LOOP ITERATION COUNT

(71) Applicant: Texas Instruments Incorporated, Dallas, TX (US)

(72) Inventors: Kai Chirca, Dallas, TX (US); Paul Daniel Gauvreau, Plano, TX (US); David Edward Smith, Jr., Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 61 days.

(21) Appl. No.: 17/578,516

(22) Filed: Jan. 19, 2022

(65) Prior Publication Data

US 2022/0137972 A1 May 5, 2022

Related U.S. Application Data

(63) Continuation of application No. 16/888,783, filed on May 31, 2020, now Pat. No. 11,294,681.

(60) Provisional application No. 62/855,468, filed on May 31, 2019.

(51) Int. Cl.
*G06F 9/32* (2018.01)
*G06F 9/38* (2018.01)

(52) U.S. Cl.
CPC ............ *G06F 9/325* (2013.01); *G06F 9/3806* (2013.01); *G06F 9/3846* (2013.01)

(58) Field of Classification Search
CPC .............................. G06F 9/325; G06F 9/3806
See application file for complete search history.

(56) References Cited

U.S. PATENT DOCUMENTS

| | | | |
|---|---|---|---|
| 5,909,573 | A | 6/1999 | Sheaffer |
| 5,951,679 | A | 9/1999 | Anderson et al. |
| 9,996,358 | B2 | 6/2018 | Falsafi et al. |
| 10,275,249 | B1 | 4/2019 | Richins |

(Continued)

OTHER PUBLICATIONS

Karthikeyan Sankaralingam, Ramadass Nagarajan, Haiming Liu, Changkyu Kim, Jaehyuk Huh, Doug Burger, Stephen W. Keckler and Charles R. Moore, "Exploiting ILP, TLP, and DLP with the Polymorphous TRIPS Architecture", June, IEEE, pp. 1-12 (Year: 2003).*

(Continued)

*Primary Examiner* — Courtney P Carmichael-Moody
(74) *Attorney, Agent, or Firm* — Carl G. Peterson; Frank D. Cimino

(57) ABSTRACT

An integrated circuit comprising instruction processing circuitry for processing a plurality of program instructions and instruction prediction circuitry. The instruction prediction circuitry comprises circuitry for detecting successive occurrences of a same program loop sequence of program instructions. The instruction prediction circuitry also comprises circuitry for predicting a number of iterations of the same program loop sequence of program instructions, in response to detecting, by the circuitry for detecting, that a second occurrence of the same program loop sequence of program instructions comprises a same number of iterations as a first occurrence of the same program loop sequence of program instructions.

20 Claims, 4 Drawing Sheets

(56) References Cited

U.S. PATENT DOCUMENTS

| | | |
|---|---|---|
| 2007/0113059 A1 | 5/2007 | Tran |
| 2015/0121050 A1 | 4/2015 | Williams et al. |
| 2016/0132331 A1 | 5/2016 | Godard |
| 2018/0349144 A1 | 12/2018 | Pal |
| 2020/0089498 A1 | 3/2020 | Annamalai |
| 2020/0364052 A1 | 11/2020 | Chinchole |

OTHER PUBLICATIONS

International Search Report for PCT/US2020/035567 dated Sep. 17, 2020.

Nitya Ranganathan, et al., "Combining Hyperblocks and Exit Prediction to Increase Front-End Bandwidth and Performance: Department of Computer Sciences Technical Report TR-02-41", Department of Computer Sciences The University of Texas at Austin and Rutgers State University, pp. 1-27 (Year: 2002).

Gou Pengfei, Yang Bing, Yu Mingyan, Mao Zhigang, "Novel O-GEHL Based Hyperblock Predictor for EDGE Architectures", IEEE, pp. 172-180 (Year: 2012).

Ming Cong, Hong An, Yongqing Ren, Canming Zhao, Jun Zhang, "A feasibility study on hyperblock-based aggressive speculative execution model", IEEE, pp. 119-123 (Year: 2009).

\* cited by examiner

PROCESSING DEVICE WITH A MICROBRANCH TARGET BUFFER FOR BRANCH PREDICTION USING LOOP ITERATION COUNT

CROSS-REFERENCE TO RELATED APPLICATION

This application is a continuation of U.S. patent application Ser. No. 16/888,783, filed May 31, 2020, which claims the benefit of and priority to U.S. Provisional Application No. 62/855,468, filed May 31, 2019, both of which are hereby fully incorporated herein by reference.

BACKGROUND

The example embodiments relate to a processing device, such as a microprocessor or a digital signal processor, that can be formed as part of an integrated circuit, including on a system on a chip (SoC). More specifically, embodiments relate to such a processing device with a micro-branch target buffer for a branch predictor.

Processing devices execute program instructions of many types, with one type of instruction being a branch instruction. A branch instruction is one that can change execution of program instructions away from the sequential instruction order, if a condition associated with the branch instruction is met. If the condition is met so that the execution is changed from sequential-order execution, the branch is said to be taken; conversely, if the condition is not met so that the execution continues in sequential-order execution, the branch is said to be not taken.

Contemporary processing devices often process an instruction sequence through a pipeline, or the device may include plural instruction pipelines and each pipeline can separately process a respective instruction sequence. A pipeline, or each such pipeline, includes a number of stages or phases, and each achieves one or more associated acts for an instruction processed at that stage. Typical pipeline stages/phases, and in a common order, may include instruction fetch, instruction decode, instruction execute, memory access, and instruction writeback, with some of these modified or omitted in certain processors, such as in certain digital signal processors.

The combination of instruction pipelining and branch instructions can be very computationally powerful, but also can provide additional complexities. For example, without added aspects as discussed below, when a branch instruction reaches the execute stage and is then determined to be taken, there is the possibility (more commonly incurred in earlier-generation processors) that information in the stages preceding the execute stage had to be discarded, often referred to as flushed. In other words, given the sequential nature of a pipeline, typically a first instruction proceeding through the pipeline would be followed by a second sequential instruction behind it. However, if the first instruction is a taken branch, then the second instruction behind it, and on its way toward execution, cannot be permitted to execute and write its results, as such a result is to occur only if the branch is not taken, rather than taken. In some instances, therefore, the second instruction (and any other instruction following the first in the pipeline) is flushed, and the pipeline is then loaded with the next instruction to follow the taken branch, where that next instruction is typically referred to as the target instruction.

Given the preceding, branch prediction may be performed in processing devices by a branch predictor. Branch prediction typically involves one or both of two different aspects: (i) predicting the branch instruction outcome, that is, whether the branch is taken (or not taken); and (ii) predicting the target address of the next instruction, if the branch is taken.

While all of the preceding aspects can improve processing device performance, inadequate branch prediction can reduce performance and, indeed, can reduce performance below that without any prediction, at least in some contexts. For example, if a branch instruction is wrongfully predicted (as to outcome or target instruction), then there is an interruption in operational flow to correct the misprediction. In more detail, if a branch instruction is predicted not taken but then reaches the execution stage and is taken, then the instructions behind the instruction in the pipeline are incorrect, must be flushed or otherwise invalidated, followed by a fetch of the proper target instruction. Various other examples are known in the art.

Accordingly, example embodiments are provided that may improve on certain of the above concepts, as further detailed below.

SUMMARY

One embodiment includes an integrated circuit, comprising both instruction processing circuitry for processing a plurality of program instructions and instruction prediction circuitry. The instruction prediction circuitry comprises circuitry for detecting successive occurrences of a same program loop sequence of program instructions. The instruction prediction circuitry also comprises circuitry for predicting a number of iterations of the same program loop sequence of program instructions, in response to detecting, by the circuitry for detecting, that a second occurrence of the same program loop sequence of program instructions comprises a same number of iterations as a first occurrence of the same program loop sequence of program instructions.

Other aspects are also disclosed and claimed.

DETAILED DESCRIPTION

Figure 1:
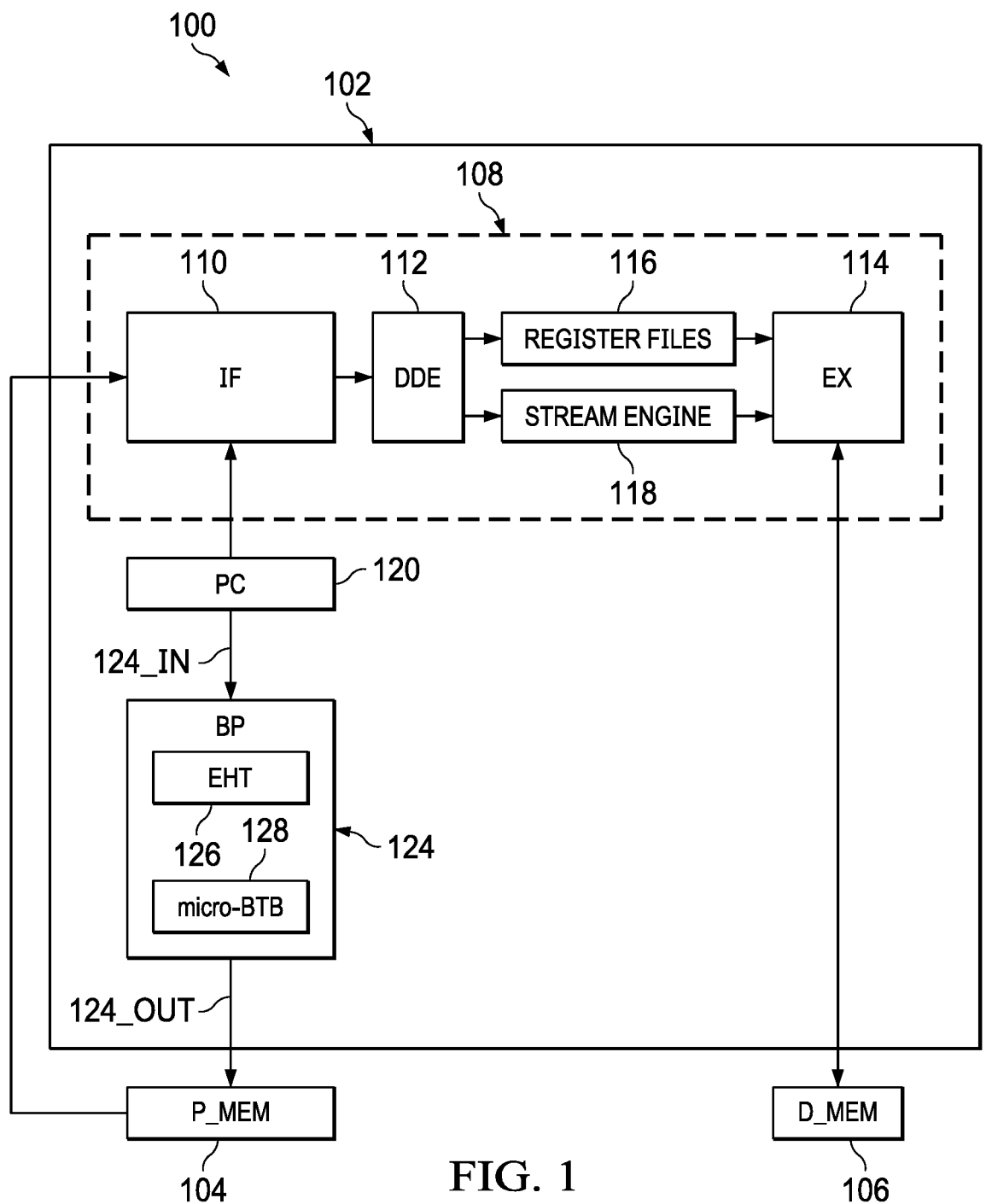
FIG. 1 illustrates a block diagram of a processing device.

FIG. 1 illustrates a block diagram of a processing device 100, such as a microprocessor or a digital signal processor that can be formed as part of an integrated circuit, including on a system on a chip (SoC). For example, processing device 100 may be implemented in connection with, or as modifications to, various processors commercially available from Texas Instruments Incorporated, including its TMS3207x series processors. Processing device 100 is illustrated in a simplified form, so as to provide to one skilled in the art an understanding of example embodiments.

Processing device 100 includes a central processing unit (CPU) core 102, which may represent one or more CPU cores. CPU core 102 is coupled to a program memory (P_MEM) block 104 and a data memory (D_MEM) block 106. Each of P_MEM block 104 and D_MEM block 106 may and most likely represents a hierarchical memory, including one or more controllers accessing one or more levels of memory (e.g., via cache), where such memory can include both internal and external memory. Generally, P_MEM block 104 provides program instructions to CPU core 102, and D_MEM block 106 may be read by, or written to, by CPU core 102. Additionally and by way of example, certain aspects of such memories may be found in co-owned U.S. patent application Ser. No. 16/874,435, filed May 14, 2020, and U.S. patent application Ser. No. 16/874,516, filed May 14, 2020 (docket TI-91022 and TI-91023, respectively), and fully incorporated herein by reference.

CPU core 102 includes a number of phases that collectively provide an instruction pipeline 108. For sake of example and with a potential reduction in total phases for simplification, FIG. 1 illustrates pipeline 108 to include three phases, each of which may include a number of stages (not separately shown), namely, an instruction fetch (IF) phase 110, an instruction dispatch and decode (DDE) phase 112, and an execution (EX) phase 114; additionally, DDE phase 112 cooperates with two potential data sources, namely, register files 116 and a stream engine 118. Each pipeline phase represents a successive action, or actions, taken with respect to a program instruction. Generally, IF phase 110 fetches an instruction from P_MEM block 104, where the address of the instruction fetched is indicated, or determined in response to, a program counter (PC) 120. In one embodiment, IF phase 110 may include three stages, including program address generation, program memory access, and an instruction program receipt. Note also that as used herein, an "instruction" may include a number of bits which, in its entirety, includes a number of instructions. For example, the fetch may be of a 512-bit instruction packet that can represent a single executable instruction, or that may be subdivided into separate instructions, for example, up to 16 separate instructions, each formed by 32 bits. Such an example may be implemented, for instance, where processing device 100 is implemented as a single instruction, multiple data (SIMD) processor which includes parallel execution units, each operable to concurrently execute a respective instruction fetched as part of larger instruction packet. Next, the fetched instruction is dispatched and decoded by DDE phase 112. In one embodiment, DDE phase 112 may include three stages, including a dispatch stage that buffers the instruction packet and potentially splits the packet based on whether it includes multiple instructions, followed by a first and second instruction decode stage to decode the instruction packet (which at that point may be split from the dispatch into separate instructions). Also in connection with completing DDE phase 112, data operations for the decoded instruction may be sourced from either register files 116 or stream engine 118, where stream engine 118 is a separate mechanism that can stream data in certain circumstances, for example in connection with certain instruction loops. Lastly, the decoded instruction (packet) is committed to and executed by EX phase 114, in connection with one or more operands from either register files 116 or stream engine 118. In one embodiment, EX phase 114 may include a number (e.g., five) of execution stages, which also may include memory read and write, so that there is not a separate writeback phase per se.

Core CPU 102 also includes a branch predictor (BP) block 124, with a more detailed example of BP block 124 shown later, in FIG. 5. As introduced earlier, branch prediction can include one or both of predicting whether a branch instruction is taken (or not taken), and predicting the target address of the branch instruction if the branch instruction is taken. In support of some of this functionality, BP block 124 includes an exit history table (EHT) 126 and a micro branch target buffer (micro-BTB) 128.

Generally, EHT 126 is populated with instruction history information based on instruction executions and predictions from those executions. Accordingly, EHT 126 is operable, in some instances using known techniques, to store or track sequential values in PC 120 so as to determine certain historic patterns and store results from those determinations, including whether an instruction at a particular PC value (instruction address) is a branch instruction. For branch instructions, EHT 126 information is updated when a prediction is determined inaccurate, that is, when the predicted instruction is predicted taken but is executed as not taken, or when the predicted instruction is predicted not taken but is executed as taken, and also may include a history (and hence, prediction) of the target address to which execution changes when a branch instruction is taken. Additionally, EHT 126 stores history information (e.g., metadata) for a sequence of values of PC 120 that correspond to a program instruction sequence that is described later as a hyperblock. For introductory purposes, generally a hyperblock is a sequence of program instructions that start with a first instruction representing an entry instruction in the hyperblock, followed by one or more instructions where, one of those following instructions is a taken branch instruction. EHT 126 history information for includes the address of the hyperblock entry instruction, the offset (address difference) between the entry instruction and the subsequent exit branch instruction, that is, the taken branch instruction following the entry instruction, and a type indicator of the exit branch instruction. Once the offset is established in EHT 126, the offset thereafter can be used as a prediction at what instruction the hyperblock will be exited, relative to the instruction address where the hyperblock started, and also potentially a prediction of whether the exit branch instruction will be taken and the target address, when the branch is taken. Still further, EHT 126 information can indicate when the target address of a taken exit branch instruction is, in successive execution of that exit branch instruction, back to a same target address in the hyperblock that includes the exit instruction, thereby indicating looping behavior, that is, return of instruction execution from end to beginning of the same hyperblock. Further, when EHT 126 identifies such a branch instruction, hereafter referred to as an exit loop branch instruction, that branch type (loop) is retained as historic information in EHT 126 along with the hyperblock entry instruction address and offset, where the instruction address may be stored in the form of a tag (folded down entry PC address). Also for the same occurrence of the loop, a data set entry (see FIG. 3) is initialized in micro-BTB 128. The data set stores the hyperblock exit loop branch instruction address, which can be determined from the hyperblock entry address plus the offset that was stored in EHT 126, along with a count of the number of iterations for that loop occurrence, which is determined at the point the exit loop branch instruction is no longer taken, as further detailed later. Thereafter, when pipeline 108 is to process the same loop again, that loop iteration count is accessible from micro-BTB 128 and provides a prediction of the number of times the loop is to iterate, before it is exited by the exit branch instruction no longer being taken, in which case instruction sequencing continues with the next instruction following the loop exit branch instruction. In this regard, BP block 124 receives an input 124_IN that provides the current instruction address indicator value of PC 120 (or some portion of that value), from which BP block 124 provides various options as to predict whether a branch instruction, including one that causes looping, is taken. For example, EHT 126 receives the input 124_IN and outputs its branch type indicator, indicating the type of a branch instruction, such as a loop exit branch instruction, or other branch instruction. When the branch type is not a loop exit branch instruction, branch predictor block 124 (e.g., EHT 126) may predict the branch instruction behavior (taken/not taken and target address) according to manners ascertainable by one skilled in the art. In the example embodiment, however, when the branch type is a loop exit branch instruction, micro-BTB 128 is checked to determine if it contains valid information corresponding to that instruction and, if so, an output of micro-BTB 128 is selected to indicate (predict) a number of times the loop that concludes with that loop exit branch instruction is taken. This prediction, therefore, or other taken/not taken predictions of BP block 124, provide an output 124_OUT that provides a signal to IF phase 110, so that once the taken/not taken prediction is provided, the next instruction may be indicated to a controller of P_MEM block 104, so that the next instruction at a predicted target address may be fetched.

Figure 2A:
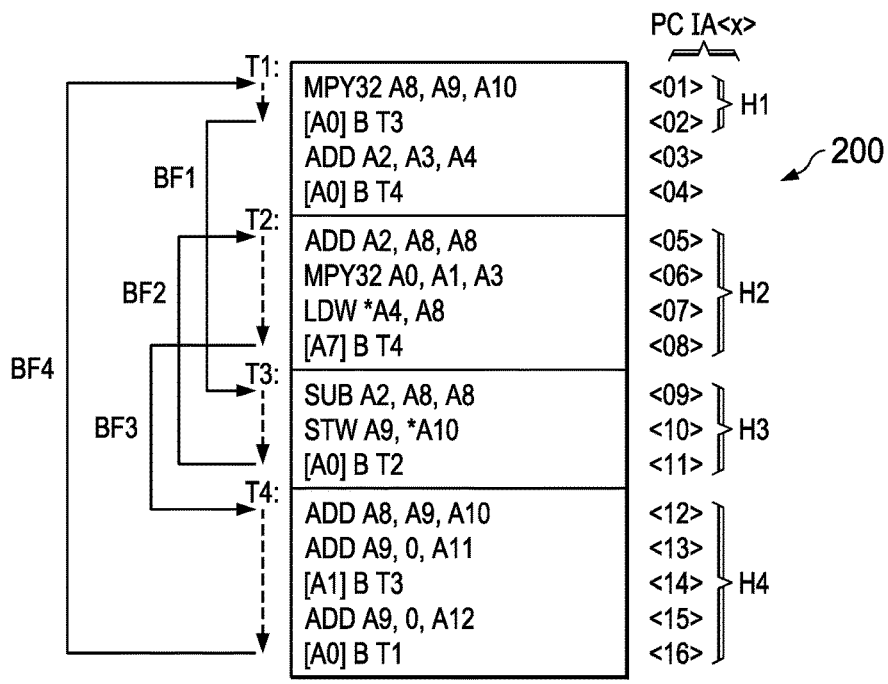
FIG. 2A illustrates 16 lines of sequential program pseudocode instructions, as an example of a program portion for the FIG. 1 processing device.

FIG. 2A illustrates 16 lines of sequential program instructions (shown as pseudocode), as an example of a program portion 200 stored in P_MEM block 104. Any or all of the program instructions may be processed (fetched, decoded, executed, etc.) by processing device 100, and it provides an example for context in explaining example embodiment aspects. Each program portion 200 instruction has a corresponding PC instruction address IA<x>, where each instruction address is sequentially numbered, relative to the others, consistent with the sequential processing of the instructions. In other words, if there is not a change in program flow, then each instruction is processed in the sequential order of its address, starting with PC IA<01>, then PC IA<02>, and so forth through PC IA<16>, and where sequencing through the addresses is achieved by advancement (e.g., incrementing) of PC 120 (FIG. 1). The various types of pseudocode syntax may be understood by one skilled in the art. For example, the instruction at PC IA<01> is a multiply of the contents at registers A8 and A9, with the result stored to register A10. As another example, there are numerous predicated branch instructions of the format of "[Ay] B Tz", with the "B" indicating a branch instruction predicated on register [Ay] and, if met, to a relative target Tz; for instance at PC IA<02>, if the predicate at register [A0] is met, then program flow branches to an instruction at target T3 (which in absolute addressing is at IA<09>).

FIG. 2A also illustrates four branch flows BF1 through BF4, shown along the left of the figure as arrows. Each branch flow BFy is illustrated as an arrow starting at a taken branch instruction and ending at the target instruction resulting from the taken branch instruction. For example, branch flow BF1 occurs when the branch instruction at PC IA<02> is taken and program flow is changed to target T3, which is the instruction at PC IA<09>. As another example, branch flow BF2 occurs when the branch instruction at PC IA<11> is taken and program flow is changed to target T2. The remaining branch flow examples will be understood to one skilled in the art.

FIG. 2A program portion 200 also illustrates the concept of an instruction hyperblock which, by way of example is shown as an integer number N (e.g., N=4) of hyperblocks H1, H2, H3, and H4. The delineation between each hyperblock Hn is a real-time programming construct based on branch instruction behavior, that is, the hyperblock beginning and end, and thus the sequence of instructions between the beginning and end, are defined based on the actual execution (or predicted) behavior of its branch instructions. Specifically, each hyperblock Hn identifies a set of instructions that starts with an entry point instruction and ends with a take branch exit instruction. An entry point instruction typically occurs either at the beginning of a number of instructions, or as a target instruction from a taken branch in another hyperblock. For example in FIG. 2A, when the branch instruction at PC IA<02> is taken, shown by branch flow BF1, to target instruction T3, that T3 target instruction (at address PC IA<09>) becomes an entry point instruction for hyperblock H3. Accordingly, the hyperblock entry point instruction is an instruction to where program flow can be directed so that instructions, starting at the entry point instruction, are sequentially processed in the respective hyperblock, and then conclude with a taken branch ("exit") instruction. Accordingly, Table 1 below indicates each hyperblock and its corresponding entry point instruction address.

TABLE 1

| Hyperblock | Entry point instruction address |
| --- | --- |
| H1 | IA<01> |
| H2 | IA<05> |
| H3 | IA<09> |
| H4 | IA<12> |

A hyperblock exit instruction concludes the hyperblock and is a taken branch instruction to a different hyperblock or is the end to the program (or a program portion). For example starting from PC IA<01>, its first instruction address is a target T1 from another hyperblock, and its next sequential instruction, that is at PC IA<02>, the branch instruction is taken (to target T3), thereby making that PC IA<02> branch instruction the end of the hyperblock H1. Accordingly, based on this and the other FIG. 2A illustrated examples of taken branch instruction behavior, then Table 2 below indicates each hyperblock and its corresponding exit instruction address.

TABLE 2

| Hyperblock | Exit instruction address |
| --- | --- |
| H1 | IA<02> |
| H2 | IA<08> |
| H3 | IA<11> |
| H4 | IA<16> |

A hyperblock may include more than one branch instruction that can branch program control out of the hyperblock, and a branch instruction before the exit instruction is referred to as an early exit. For example, hyperblock H4 includes two branch instructions, namely: (i) at PC IA<14>, a potential (and early exit) branch to a target address T3, as predicated on register A1; and (ii) at PC IA<16>, a potential (and exit instruction) branch to a target address T1, as also predicated on register A0. Note, therefore, that a hyperblock is defined so that any branch instruction in it can only change program flow to another hyperblock and, not, therefore, to another instruction within the beginning and end of the same hyperblock—this definition can dictate the boundaries of a hyperblock, as further demonstrated below. Also with this definition, BP block 124 predicts the first branch in the hyperblock sequence that will be taken, which thereby implies a real time prediction that the hyperblock ends with that instruction predicted as taken. For example in hyperblock H1, if the branch instruction at PC IA<02> is predicted taken, this necessarily indicates that the branch instruction at PC IA<04> is not part of hyperblock H1. Conversely, if the branch instruction at PC IA<04> is predicted taken, this necessarily indicates that the branch instruction at PC IA<02> is predicted not taken, and also in this case hyperblock H1 would include all four instructions, from PC IA<01> to PC IA<04>. And, if no branch instruction in a hyperblock is predicted taken, the control flow through the hyperblock is completely sequential and continues to the next sequential hyperblock.

Figure 2B:
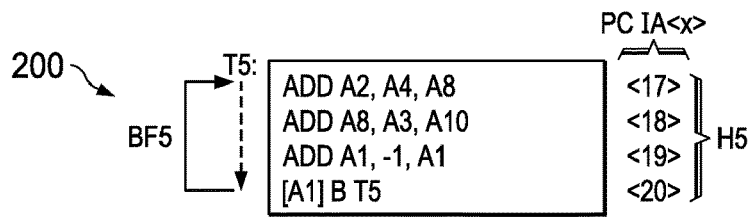
FIG. 2B illustrates another pseudocode instruction sequence, depicting an example of hyperblock program loop.

FIG. 2B illustrates another pseudocode instruction sequence, which by example follows after the sequence of instructions (and hyperblocks) of FIG. 2A, thereby starting at PC IA<17> and including four instructions ending at PC IA<20>. Accordingly, the FIG. 2B sequence may be reached when the branch instruction concluding hyperblock H4 in FIG. 2A, at PC IA<16>, is not taken. Additionally, the FIG. 2B sequence illustrates an example of a hyperblock program loop, which is now introduced and is implicated in various aspects of example embodiments, as described below. In FIG. 2B, the example a hyperblock program loop occurs due to a branch flow BF5, which indicates that the branch instruction at PC IA<20> directs program flow to target T5, that is, to the entry point instruction, of the same hyperblock, at PC IA<17>. This example illustrates that a hyperblock program loop occurs when a sequence of instructions concludes with an exit branch instruction that, when taken, returns program flow to the entry point instruction of the same sequence that preceded the exit branch, without any intervening taken branch between the entry point instruction and the taken exit branch instruction. Accordingly, while the branch flows BF1 through BF4 in FIG. 2A are between different hyperblocks, in FIG. 2B branch flow BF5 returns from a hyperblock exit branch instruction to the start of the hyperblock, thereby providing a real time construct of a hyperblock program loop. As introduced earlier, when a sequence of instructions are executed and cause a loop, that flow (e.g., BF5) is detectable by history information accrued in, and by, and certain metadata describing that loop is stored in EHT 126, such as the loop entry address (e.g., PC IA<17> in FIG. 2B) and an offset from that loop entry address to the location of the exit branch instruction (e.g., offset=3, from PC IA<17> to PC IA<20> in FIG. 2B). Also at that time, if an entry for the detected loop is not yet in micro-BTB 128, then one is created by overwriting or evicting the oldest loop characterizing data set in micro-BTB 128, where such a data set is further detailed later. In any event, program loops can be common in certain types of code, particularly for example in some digital signal processors that use programming with frequently-used predicated branch instructions, as are shown in the example of FIG. 2B. Given the possibility, or commonality, of program loops, processing device 100 is improved with micro-BTB 128 which improves upon predicting such loops, so as to improve processing throughput, as further detailed below.

Figure 3:
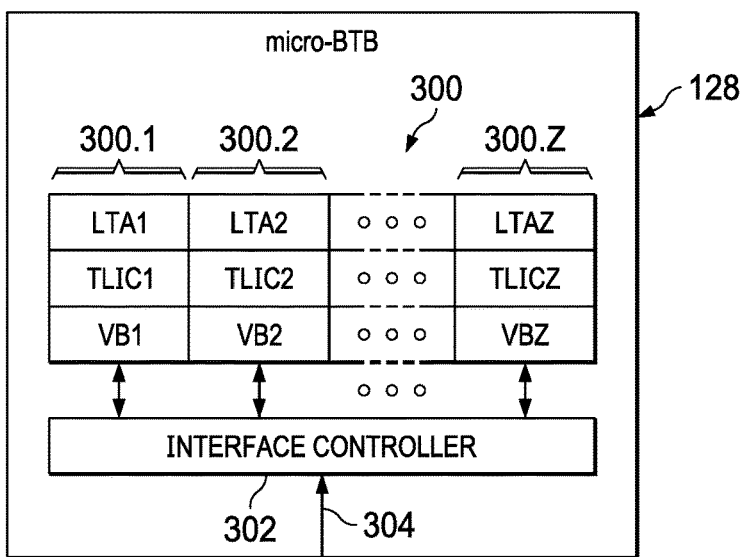
FIG. 3 illustrates greater detail of the FIG. 1 micro-BTB.

FIG. 3 illustrates greater detail of the FIG. 1 micro-BTB 128. Micro-BTB 128 includes circuitry, such as dedicated discrete registers 300, for storing an integer number Z of hyperblock program loop characterizing data sets, each set of three different values. Micro-BTB 128 also includes an associated interface controller 302, for reading and writing the register values, in combination with an interface with respect to BP block 124. FIG. 3 illustrates the Z sets as set 300.1, 300.2, . . . , 300.Z. Each three-value set 300.z corresponds to, and characterizes certain aspects of, a respective one of Z different hyperblock program loops that are detected by processing device 100, as it is processing program code. Within each of the Z sets, the three different program loop values are a loop tag address (LTA), a total loop iteration count (TLIC), and a valid bit (VB). In FIG. 3, therefore, each set 300.z is shown with these three values, each referenced with an ending indicator of z to show the association of the values with a respective set z of the total of Z sets. For example, for a first detected hyperblock program loop, set 300.1 indicates the values LTA1, TLIC1 and VB1, corresponding to that set 300.1. As another example, for a second detected hyperblock program loop, set 300.2 indicates the values LTA2, TLIC2 and VB2, corresponding to that set 300.2. Similar examples will be understood by one skilled in the art. Generally, LTAz is a 47-bit register data value that identifies the PC address (or a portion thereof) of a detected taken program loop exit branch instruction, that is, LTAz is a tag to the end of a hyperblock, for example that can be identified from the hyperblock entry instruction address plus the offset to the subject exit branch instruction; alternatively, LTAz could be to the hyperblock entry instruction address. TLICz is an 8-bit register and identifies a predicted total loop iteration count, that is, the total number of iterations (up to $2^8=256$) that an occurrence of the entire hyperblock program loop will experience before exiting the hyperblock, that is, the number of times the entire sequence, from the hyperblock entry instruction to the LTA-identified taken exit branch back that follows that entry instruction, is executed before the loop is exited when its loop exit branch instruction is not taken. Lastly, VBz is a 1-bit register that indicates whether the respective values of TLICz and LTAz are expected to be a valid prediction of the looping count in TLICz, whereby an indication of valid results in processing device 100 using the set values to predict the number of loop iterations for future occurrences of the same hyperblock program loop. Each of these values is populated, updated, and replaced by interface controller 302, as detailed below.

Figure 4:
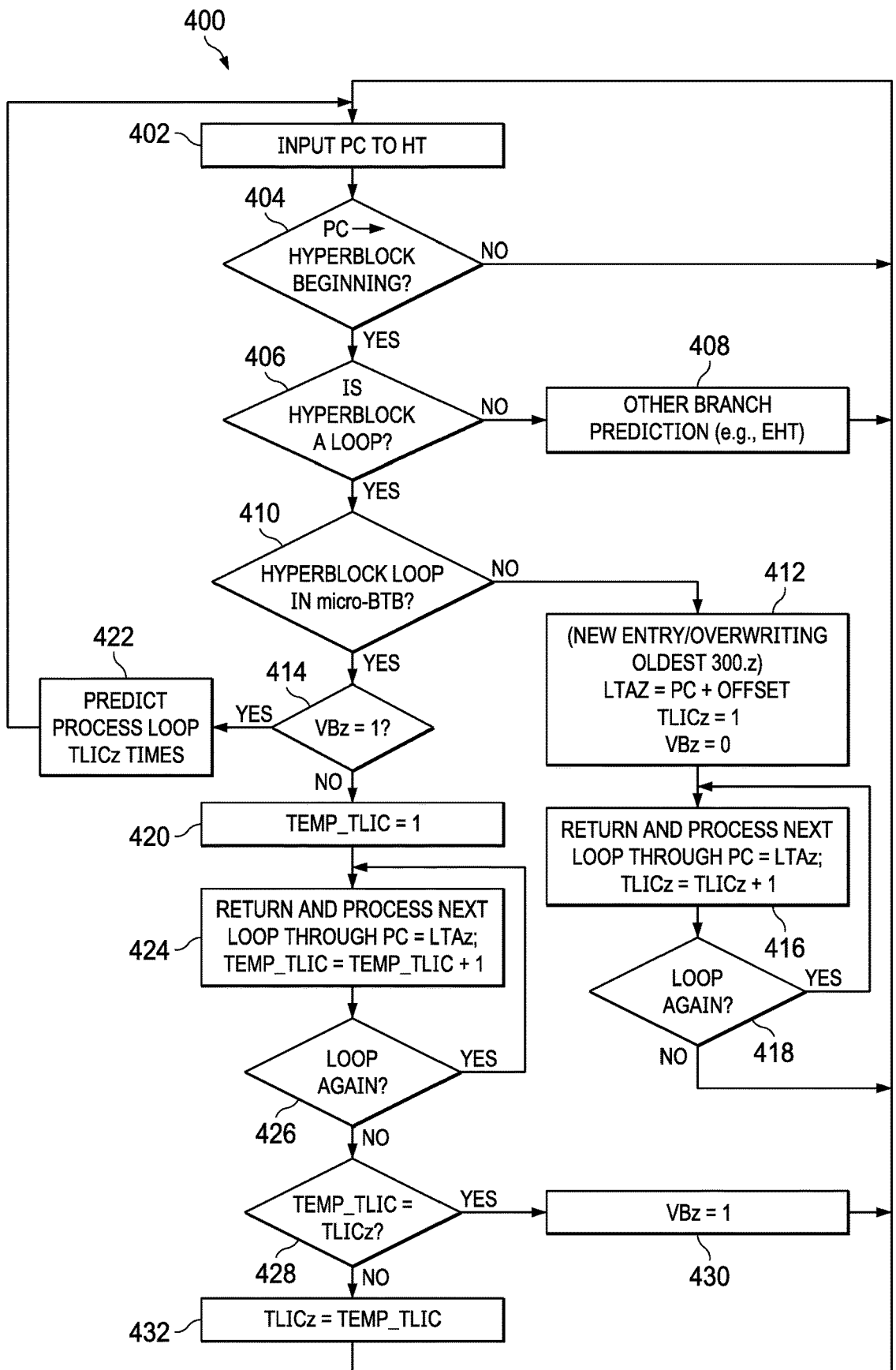
FIG. 4 illustrates a flowchart of a method of a portion of the operation of the FIG. 1 BP block.

FIG. 4 illustrates a flowchart of a method 400 of a portion of the operation of the FIG. 1 BP block 124, in the context of the FIG. 3 interface controller 302 populating, updating, and replacing values in dedicated registers 300. Accordingly, unless expressly stated otherwise, while the following discussion of method 400 is provided in terms of operational steps, the circuitry for accomplishing such steps may be partitioned among EHT 126, micro-BTB, and other circuitry ascertainable by one skilled in the art in either BP block 124 or core 102. Method 400 is illustrated and described for purposes of detailing various functions and ordering, as may be implemented in one or both of hardware circuitry and software/firmware/state machine control.

Method 400 commences with a step 402. Step 402 inputs the current value of PC 120 (instruction address, or a portion thereof) to EHT 126. For example returning to FIG. 2A, any of PC IA<01> through PC IA<16> may be input at step 402 (or, in FIG. 2B, and of PC IA<17> through PC IA<20>). Next, method 400 continues to step 404.

Step 404 is a conditional check that controls method flow based on whether the input PC value from step 402 corresponds to a beginning of hyperblock, that is, a first instruction in a sequence of instructions that concludes with a taken branch instruction, where that taken branch instruction is a first taken branch following that first instruction. Recall that EHT 126 includes various historically-determined or stored instruction information. Accordingly, the step 404 determination may be made, for example, by using the PC value input from step 402 as a lookup in EHT 126 which, from a prior occurrence of processing of the instruction identified by the PC value, may store an indication of whether that first instruction is the beginning of a hyperblock. If the PC value does not identify an instruction at the beginning of a hyperblock (e.g., FIG. 2A, PC IA<03>), method 400 returns from step 404 to step 402, at which a next PC value can be processed. If the PC value identifies an instruction at the beginning of a hyperblock (e.g., FIG. 2B, PC IA<17>), method 400 continues from step 404 to step 406.

Step 406 is a conditional check that controls method flow based on whether the hyperblock, confirmed in the preceding step 404, is a hyperblock program loop, that is, a hyperblock that concludes with a taken branch exit instruction that returns flow back to the beginning instruction in the hyperblock (e.g., FIG. 2B). This step 406 determination also may be made, for example, by using the PC value input from step 402 as a lookup in EHT 126 which, from a prior occurrence of processing of the hyperblock identified by the PC value may store an indication of whether that hyperblock is a hyperblock program loop. If the hyperblock is not a hyperblock program loop, method 400 proceeds from step 406 to step 408. If the hyperblock is a hyperblock program loop, method 400 proceeds from step 406 to step 410.

Step 408, reached from step 406 detecting a hyperblock is not a hyperblock program loop, processes the (non-looping) branch instruction in the hyperblock according to other branch prediction processes. For example, if the branch instruction is not predicted taken, it can be considered implicitly not taken, in which case there is no prediction but the instruction is processed through all phases and, if execution confirms the implicit not taken expectation, then the instruction following the not taken branch is next processed, and so forth. Or, if there is a misprediction, pipeline 108 may be flushed and a new prediction can be applied, with the goal that the predicting process runs independent of CPU execution and BP 124 getting as far ahead as it can (e.g., eight hyperblocks in one implementation) before waiting for core processing to catch up. In this process, every time a hyperblock is confirmed, BP 124 can then predict one more hyperblock. If at any point there is a misprediction, the above process restarts after correcting the wrong prediction in the EHT 126 and micro-BTB 128 (and an associated 512 shown in FIG. 5). In any event, following this other activity shown generally by step 408, method 400 returns from step 408 to step 402.

Step 410, reached from step 406 detecting a hyperblock is a hyperblock program loop, is a conditional check that controls method flow based on whether the step 406 detected hyperblock program loop is stored in micro-BTB 128. For example, the step 410 determination may be made by using the PC value input from step 402 as a lookup in micro-BTB 128 and, more particularly, into each tag LTA1 through LTAZ of dedicated registers 300. Accordingly, if a match does not occur as between the PC input and an LTAz entry in a dedicated register, then the condition of step 410 is not met and method 400 proceeds from step 410 to step 412. If such a match does occur, then then the condition of step 410 is met and method 400 proceeds to step 414.

Step 412 is reached when a hyperblock program loop has been detected but is not in micro-BTB 128. Recall from above that typically when a hyperblock program loop is detected from actual instruction execution, at that time an entry is created or exists in EHT 126 with the hyperblock starting (entry instruction) address and exit instruction offset, and also an initial entry is created into a data set in micro-BTB 128, that entry corresponding to that detected hyperblock program loop. Note now that that when the data set is created in micro-BTB 128, its valid bit VBz is set to invalid and its total loop iteration count TLICz is set to the number of times the loop executed, that is, one plus the number of times its branch exit instruction was taken. As a result, often when a given hyperblock has been previously detected, there will be a corresponding entry in micro-BTB 128; however, after such an initial entry is created, it also is possible that after that entry is created, other instructions are executed that cause other entries into micro-BTB 128, which may cause an eventual overwrite of the prior data set for the given hyperblock program loop. In such an event, therefore, step 412 can be reached, in which case at that point micro-BTB 128 does not store, or no longer stores, a characterization of the hyperblock program loop. In response, step 412 initiates the set of three of values into a location 300.z in dedicated registers 300. The written information is either newly written into an empty register set or by overwriting the oldest (first in, first out) data in dedicated registers 300, indicating, therefore, that micro-BTB 128 provides a mechanism for tracking which data set in its registers 300 is the oldest. FIG. 4 further indicates the three different data elements initiated (e.g., written or otherwise initialized) into the selected location 300.z, namely: (i) the hyperblock program loop exit address (the current PC value plus the offset to the taken exit branch instruction, as obtainable from EHT 126); (ii) the total loop iteration count TLICz is set to an initial value of 1; and (iii) the valid bit VBz is set to an invalid indication, which for purposes of example is a value of 0. Next, method 400 proceeds from step 412 to step 416.

Step 416 returns the execution of program instructions by core 102 to the beginning of the loop (e.g., hyperblock beginning) previously detected in step 404, and that caused the method 400 to step through steps 406, 410, and 412. Returning to the example of FIG. 2B, therefore, step 416 causes branch flow BF5, whereby core 102 next processes (e.g., IF, DDE, EX, etc.) the instruction at target T5, that is, at PC IA<17>. Further, core 102 continues to process all program instructions in the hyperblock through the loop exit branch instruction, identified when executed (or when PC 120 equals the IA of the hyperblock beginning plus its offset, as available from EHT 126). At that point, the total loop iteration count TLICz is incremented. For example, if step 416 is reached for the first time for a given hyperblock program loop, reaching that step for the first time will follow first a single iteration of all the hyperblock program loop instructions so as to reach and execute the loop exit branch instruction, and second when the loop was processed a second time by step 416; accordingly, the reaching of step 416 for the first time in connection with a new data set entry into micro-BTB 128 will occur following the second iteration of the entire loop, so that incrementing TLICz sets it to a value of 2, indicating two complete iterations of the loop's instructions. Next, method 400 continues from step 416 to step 418.

Step 418, reached from step 416 completing execution of all instruction in a hyperblock program loop, is a conditional check that controls method flow based on whether the hyperblock program loop is to be again taken, that is, whether the loop exit branch instruction is again taken to return to the program loop beginning, or is not taken so that program flow continues with the next sequential instruction following the loop exit branch instruction. Since step 418 is reached via step 410 (and steps 412 and 416), then the full valid data set for the program loop is not yet provided in micro-BTB 128 (that is, VBz=0). Accordingly, there is not yet a valid prediction, unless a prediction is otherwise provided outside of micro-BTB 128, of whether the loop exit branch instruction is taken, so instead there may be a wait until the loop exit branch instruction is executed to determine if the program loop is again taken. If the hyperblock program loop is to be repeated for another iteration, then method 400 returns from step 418 to step 416. If the hyperblock program loop is not to be repeated, then method 400 returns from step 418 to step 402. Note that when this latter condition occurs, micro-BTB 128 will store a data set for the program loop, with its hyperblock tag address indicated by LTAz, the total number of times the particular hyperblock program loop was processed as TLICz, but the valid bit VBz will still indicate invalid.

Returning to step 414, recall it is reached when step 410 determines that the PC value corresponding to the step 406 detected hyperblock program loop is stored as tag address LTAz in micro-BTB 128. Step 414 then determines whether the valid bit VBz, for the loop characterizing data set 300z of the detected hyperblock program loop, is valid. If that valid bit VBz indicates the data set is invalid, then method 400 proceeds from step 414 to step 420. If that valid bit VBz indicates the data set is valid, then method 400 proceeds from step 414 to step 422.

Step 420 is reached when a data set 300z is stored in micro-BTB 128 for a detected hyperblock program loop, but when the valid bit VBz for that set indicates the set is currently invalid. Recall that such an invalid indicator may occur either when a hyperblock program loop has been identified by metadata in EHT 126 and an initial entry is correspondingly created in micro-BTB 128, or from step 412 when a hyperblock program loop is detected but there is not at that time a data set entry for it in micro-BTB 128. As is now explained, when a second occurrence of all iterations of that same hyperblock program loop is concluded, then the valid bit VBz is changed to valid, so long as the number of iterations is the same for both the first and second occurrence. In this regard, first step 420 initializes a temporary loop iteration counter, TEMP_TLIC, to a value of 1. Next, method 400 continues from step 420 to step 424.

Step 424 is similar to the above-described step 416, where step 416 applied to a first occurrence of a hyperblock program loop iterations, that is, one not then characterized in micro-BTB 128, while step 416 applies to a second occurrence of such a hyperblock program loop iterations, after it is characterized, albeit still marked invalid, in micro-BTB 128. Accordingly, step 424 also returns the execution of program instructions by core 102 to the beginning of the loop (e.g., hyperblock beginning) previously detected in steps 404 and 406, whereby core 102 again processes the instruction at the beginning of the hyperblock program loop, followed by processing all instructions in the hyperblock through the loop exit branch instruction, again identified when the total of the offset and the PC 120 IA indicates the loop exit branch instruction address. At that point, the temporary total loop iteration count TEMP_TLIC is incremented so, for example, when step 424 is reached for the first time for a given hyperblock program loop, that indicates the hyperblock program loop was processed first to detect the hyperblock program loop, and then the loop was processed a second time by step 424, in which case the reaching of step 424 will be the second iteration of the entire hyperblock program loop, so that incrementing TEMP_TLIC sets it to a value of 2, indicating two complete iterations of the program loop's instructions. Next, method 400 continues from step 424 to step 426.

Step 426, reached from step 424 completing a program loop, is a conditional check that controls method flow based on whether the hyperblock program loop is to be again taken, that is, whether the loop exit branch instruction is again taken to return to the program loop beginning, or is not taken so that program flow continues with the sequential next instruction following the loop exit branch instruction. Since step 426 is reached via step 414 (and steps 420 and 424), then the full valid data set for the program loop is not yet provided in micro-BTB 128, as the valid bit VBz still indicates invalid. Accordingly, there is not yet a valid prediction in micro-BTB 128 of whether the loop exit branch instruction is taken, so instead core 102 executes the loop exit branch instruction to determine if the program loop is again taken. If the execution indicates the branch is taken, that is the hyperblock program loop is to be repeated, then method 400 returns from step 426 to step 424. Accordingly, note that the combination of steps 424 and 426 repeats until all iterations of the second occurrence of the hyperblock program loop are complete, and at that time TEMP_TLIC, as a result of each step 424 increment, provides a total count of program loop iterations for the given hyperblock program loop. Lastly, once the last iteration for the hyperblock program loop is complete, then the step 426 condition is no longer satisfied, and then method 400 proceeds from step 426 to step 428.

From the preceding, step 428 is reached following a second occurrence of a hyperblock program loop, and the conclusion of all iterations of that second occurrence, the number of which will be stored in the temporary total loop iteration count TEMP_TLIC. Step 428 compares the second occurrence count TEMP_TLIC with the first occurrence count TLICz for the same hyperblock program loop, where recall TLICz was an earlier iteration count for the first occurrence of the same hyperblock program loop, as previously stored in micro-BTB 128. If the second occurrence iteration count (TEMP_TLIC) matches the first occurrence iteration count (TLICz), then method 400 proceeds from step 428 to step 430. If TEMP_TLIC does not match TLICz, then method 400 proceeds from step 428 to step 432.

Step 430 is reached when TEMP_TLIC=TLICz, and in response sets the valid bit VBz in micro-BTB 128, corresponding to the just-completed hyperblock program loop, to a valid state (e.g., VBz=1). Particularly, because step 428 compared the total iteration counts for two successive occurrences of the same program loop, then if those two counts match, method 400 thereby detects a consistent and thereby predictable behavior for the hyperblock program loop, based on a same number of times the same loop exit branch was taken in both the first occurrence and second occurrence of that program loop. Hence, the predictable behavior is acknowledged by the validity setting of step 430, after which method 400 returns to step 402. As a result of this particular method flow, when the same program loop is next encountered and processed, then method 400 will direct its flow through steps 402, 404, 406, 410, 414, and 422.

Step 422 is reached, as described above, when the valid bit VBz indicates the data set is valid. In response, step 422 will, from the characterization in micro-BTB 128, predict a number of iterations for a next occurrence of that same program loop. Particularly, at that point BP block 124, via a count TLICz corresponding to the loop and in micro-BTB 128, predicts a number of iterations of the loop. Core 102 thereby processes all instructions of the loop for a number of iterations indicated by the prediction (e.g., either re-fetched, decoded, executed, etc., or otherwise repeated), without any additional delay that might occur from a lack of prediction or from prediction architectures that are limited, for example, by predicting a small number of iterations or otherwise incapable of providing the flexibility of the example embodiment.

Step 432 is reached when TEMP_TLIC≠TLICz, that is, the second occurrence of a hyperblock program loop iterated a different number of times than the first occurrence of that same program loop. In this event, there is not successively consistent behavior of the number of loop iterations. Step 432, therefore, in contrast to validating the corresponding data set 300.z in micro-BTB 128, instead updates its loop iteration counter TLICz with the current value of the second occurrence count TEMP_TLIC, that is, it sets TLICz equal to TEMP_TLIC. For example, assume in a first occurrence of a program loop that it iterates 30 times, which is stored as TLICz in a micro-BTB 128 data set 300.z. For a second and successive occurrence of that same program loop, assume that it iterates 40 times, that is, a different number than the iteration count of the first occurrence. In this example, therefore, step 428 detects the disparity of the loop iterations of the two successive hyperblock program loop occurrences, and step 432 updates the data set value of TLICz to 40, while not, however, validating that data set. Next, method 400 returns from step 432 to step 402, and note therefore that when a next (e.g., third) occurrence of the same program loop is encountered by method 400, there still may be an entry (if it has not been overwritten in the interim) for that program loop in micro-BTB 128, but it will be marked invalid (VBz=0). Accordingly, once again method 400 will proceed to step 420, iterate the program loop a number of times that are counted by TEMP_TLIC, and again step 428 will repeat the above-described comparison. As a result, the data set 300.z for the program loop will be marked valid only once two successive occurrences of that same program loop have iterated a same number of times.

Figure 5:
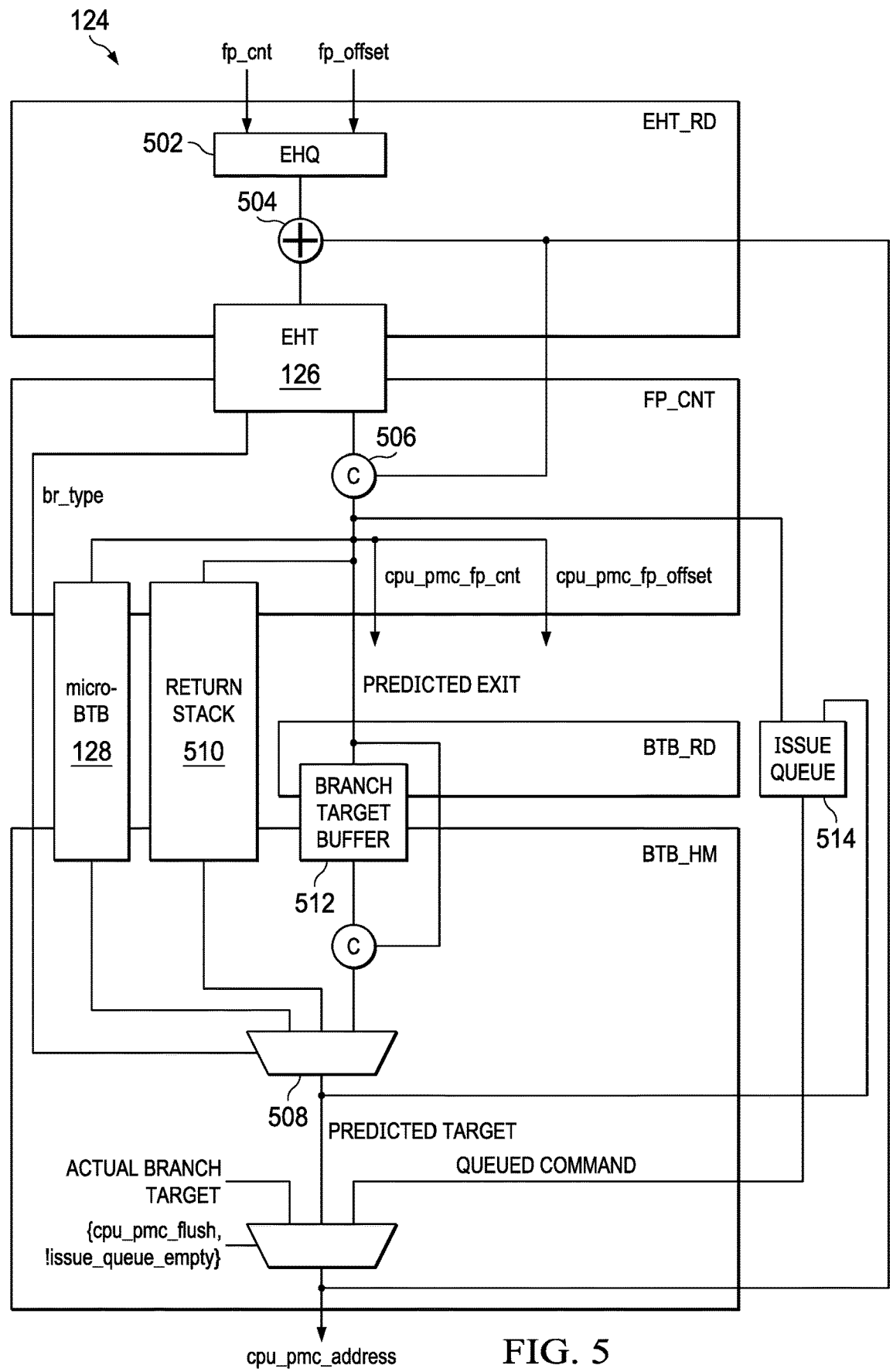
FIG. 5 illustrates a schematic of additional details of an example embodiment for BP block 124 of FIG. 1.

FIG. 5 illustrates a schematic of additional details of an example embodiment for BP block 124 of FIG. 1, including additional structure and connections relative to EHT 126 and micro-BTB 128. BP block 124 receives two inputs, fp_cnt and fp_offset, representing respectively a fetch packet counter and its offset, so that together the inputs indicate a block size for the fetched packet and are essentially related to the value in PC 120 (FIG. 1), and also are input to an exit history queue (EHQ) 502. EHQ 502 outputs history information on the last eight branches to a combiner 504, such as an XOR gate, which combines the output with an output, cpu_pmc_address, which is a program memory controller address from a preceding instruction read, and that combination is input as a tag for lookup to EHT 126, to either begin populating the EHT with metadata regarding a newly-detected hyperblock or a tag for already-populated information regarding a previously-processed hyperblock. As earlier described, when EHT 126 stores information regarding a hyperblock, it outputs two values, an instruction branch type (br_type) and an offset from the hyperblock entry instruction to the hyperblock exit instruction, and this information is connected to a comparator 506, which compares that information to cpu_pmc_address and produces a result, predicted address (Predicted_Exit) as the predicted exit instruction address. The br_type is used as a control input to a multiplexer 508. Predicted_Exit is connected as an input to several blocks, including (but not limited to) micro-BTB 128, a return stack 510 (for serving a particular type of call and return branch scenario to track each different potential call to a same return), a branch target buffer 512 (which can perform other branch prediction functions), and an issue queue 514. This connection to micro-BTB 128 facilitates the various details described above, whereby here it is seen that the earlier-described loop tag address (LTAz) is provided as Predicted_Exit. In response, if there is a hit by this tag to one of the data sets 300.z in micro-BTB 128, that result is output as one of the inputs to multiplexer 508, and if the br_type for that cycle indicates the branch instruction type is a hyperblock program loop exit instruction, then multiplexer 508 selects the output of micro-BTB 128 and outputs it as the Predicted_Target for the next instruction following the loop program exit instruction; thus, if micro-BTB 128 determines the number of loop iterations has not reached the particular count TLICz, that is, the loop has not completed all predicted iterations, the Predicted_Address will specify an address that returns program flow back to the beginning of the hyperblock program loop, for another iteration of that loop. In contrast, if the number of loop iterations has reached the particular count TLICz, then the Predicted_Address will specify an address that continues program flow to the next instruction following the end of the hyperblock program loop.

From the above, one skilled in the art should appreciate that example embodiments include a processing device with a micro-BTB 128 for a branch predictor. Further, the micro-BTB 128 includes circuitry that characterizes up to M different program loops, including a consistency-evaluated prediction for how many iterations each program loop will take. As a result, processing device efficiency may be improved, for example by reducing branch exit or loop mispredictions and the corresponding inefficiencies of them (e.g., pipeline flushes), or also providing predictions that may not be available in other processing device architectures. As another example, the example embodiment processing device permits loop iteration counts to be generated of length up to $2^N$ iterations (where N is the bit size of TLICz), but without extending the history table to require an entry for each of the $2^N$ instructions in that sequence. As another example, where dedicated registers 300 are embodied as discrete registers, prediction results may be accessed faster (e.g., within one clock cycle) as compared to other memory stores (e.g., SRAM). As still another example, the example embodiment provide an improved micro-BTB 128 that may be included with existing branch predictors without requiring many changes elsewhere to comply with it. Still further, the micro-BTB 128 may lend itself to other processing improvements. Further, while the above-described attributes are shown in combination, the inventive scope includes subsets of one or more features in other embodiments. Still further, also contemplated are changes in various aspects, including register sizes, function partitions, and the like, with the preceding providing only some examples, with others ascertainable, from the teachings herein, by one skilled in the art. Accordingly, additional modifications are possible in the described embodiments, and other embodiments are possible, within the scope of the following claims.

What is claimed is:
1. A processor comprising:
an instruction pipeline configured to process an instruction address; and
a branch predictor coupled to the instruction pipeline, the branch predictor configured to:
receive the instruction address;

determine a first status of the instruction address based on a first comparison of the instruction address with a first set of data;

in response to the first status of the instruction address corresponding to a hyperblock loop, determine a second status of the instruction address based on a second comparison of the instruction address with a second set of data;

in response to the second status of the instruction address indicating that the instruction address is included with the second set of data, determine a validity status of the second set of data associated with the instruction address; and in response to the validity status being valid, predict, based on the second set of data associated with the instruction address, a number of iterations for a next occurrence of the hyperblock loop.

2. The processor of claim 1, further comprising:
a program counter coupled between the instruction pipeline and the branch predictor.

3. The processor of claim 1, wherein:
the first set of data includes prior occurrences of processing a plurality of instruction addresses.

4. The processor of claim 1, wherein:
the first set of data includes a table of addresses;
each of the addresses in the table is associated with a respective offset and a respective type.

5. The processor of claim 1, wherein:
the second set of data includes a plurality of data sets; and
a first of the plurality of data sets includes the instruction address, a valid bit, and a total loop iteration count.

6. The processor of claim 5, wherein:
the validity status of the second set of data associated with the instruction address is determined to be valid in response to the valid bit associated with the instruction address being set to 1.

7. The processor of claim 5, wherein:
the number of iterations for the next occurrence of the hyperblock loop is determined based on the total loop iteration count.

8. The processor of claim 1, wherein:
the hyperblock loop starts with the instruction address and ends with a taken branch instruction that returns flow back to the instruction address.

9. The processor of claim 1, wherein:
the first set of data is stored in an exit history table.

10. The processor of claim 1, wherein:
the second set of data is stored in buffer.

11. A method comprising:
receiving, by a processor, an instruction address;
determining, by the processor, a first status of the instruction address based on a first comparison of the instruction address with a first set of data;

in response to the first status of the instruction address corresponding to a hyperblock loop, determining, by the processor, a second status of the instruction address based on a second comparison of the instruction address with a second set of data;

in response to the second status of the instruction address indicating that the instruction address is included with the second set of data, determining, by the processor, a validity status of the second set of data associated with the instruction address; and in response to the validity status being valid, predicting, by the processor based on the second set of data associated with the instruction address, a number of iterations for a next occurrence of the hyperblock loop.

12. The method of claim 11, wherein:
the processor includes:
an instruction pipeline configured to process the instruction address;
a program counter coupled to the instruction pipeline; and
a branch predictor coupled to the program counter.

13. The method of claim 11, wherein:
the first set of data includes prior occurrences of processing a plurality of instruction addresses.

14. The method of claim 11, wherein:
the first set of data includes a table of addresses;
each of the addresses in the table is associated with a respective offset and a respective type.

15. The method of claim 11, wherein:
the second set of data includes a plurality of data sets; and
a first of the plurality of data sets includes the instruction address, a valid bit, and a total loop iteration count.

16. The method of claim 15, wherein:
the validity status of the second set of data associated with the instruction address is determined to be valid in response to the valid bit associated with the instruction address being set to 1.

17. The method of claim 15, wherein:
the number of iterations for the next occurrence of the hyperblock loop is determined based on the total loop iteration count.

18. The method of claim 11, wherein:
the hyperblock loop starts with the instruction address and ends with a taken branch instruction that returns flow back to the instruction address.

19. The method of claim 11, wherein:
the first set of data is stored in an exit history table.

20. The method of claim 11, wherein:
the second set of data is stored in buffer.

* * * * *